United States Patent [19]

Lykes et al.

[11] Patent Number: 5,127,148

[45] Date of Patent: Jul. 7, 1992

[54] METHOD OF FABRICATING A DYNAMEOELECTRIC MACHINE

[75] Inventors: Robert E. Lykes; James L. King, both of Troy, Ohio

[73] Assignee: A. O. Smith Corporation, Milwaukee, Wis.

[21] Appl. No.: 427,442

[22] Filed: Oct. 26, 1989

[51] Int. Cl.$^5$ ............................................. H02K 15/14
[52] U.S. Cl. ........................................ 29/596; 310/42; 310/89; 310/90
[58] Field of Search .................... 29/596, 598; 310/42, 310/89, 90

[56] References Cited

U.S. PATENT DOCUMENTS

| | | | |
|---|---|---|---|
| 2,243,464 | 5/1941 | Kucher | 29/156.4 |
| 3,256,590 | 6/1966 | Myers | 29/596 |
| 3,300,666 | 1/1967 | Frazier | 310/42 |
| 3,413,715 | 12/1968 | Latussek et al. | 29/596 |
| 3,714,705 | 2/1973 | Lewis | 29/596 |
| 4,005,320 | 1/1977 | Mabushi et al. | 310/40 |
| 4,017,964 | 4/1977 | Schulte et al. | 29/596 |
| 4,121,127 | 10/1978 | Adelski et al. | 310/67 |
| 4,172,695 | 10/1979 | Uesugi | 417/424 |
| 4,216,571 | 8/1980 | Miller et al. | 29/596 |
| 4,684,837 | 8/1987 | Schaefer et al. | 310/87 |
| 4,716,648 | 1/1988 | Nel | 29/596 |

Primary Examiner—Carl E. Hall
Attorney, Agent, or Firm—Andrus, Sceales, Starke & Sawall

[57] ABSTRACT

A rotary motor includes bearing frames fixedly secured with a main round frame. The stator unit is secured directly to the round frame. The bearing frames are shallow cup-shaped metal members having an outer cylindrical flange extending as a continuous member about the circumference of a flat end wall structure. The flange is specially constructed to have a maximum diameter slightly greater than the internal diameter of the round frame, and is pressed into the round frame with the frame located on a precise radial plane through the round frame. A rotary bearing is secured within the end frame for rotatably supporting a rotor unit. The bearing frame is preferably a stamped steel member with the flange having a plurality of small radial projections. The bearing frame is pressed into the round frame using a suitable hydraulic press. The end edge of the round frame is formed as a reference for locating of the bearing frame in the round frame. The pressed frame is welded to the main frame at the projections by resistance welding.

6 Claims, 2 Drawing Sheets

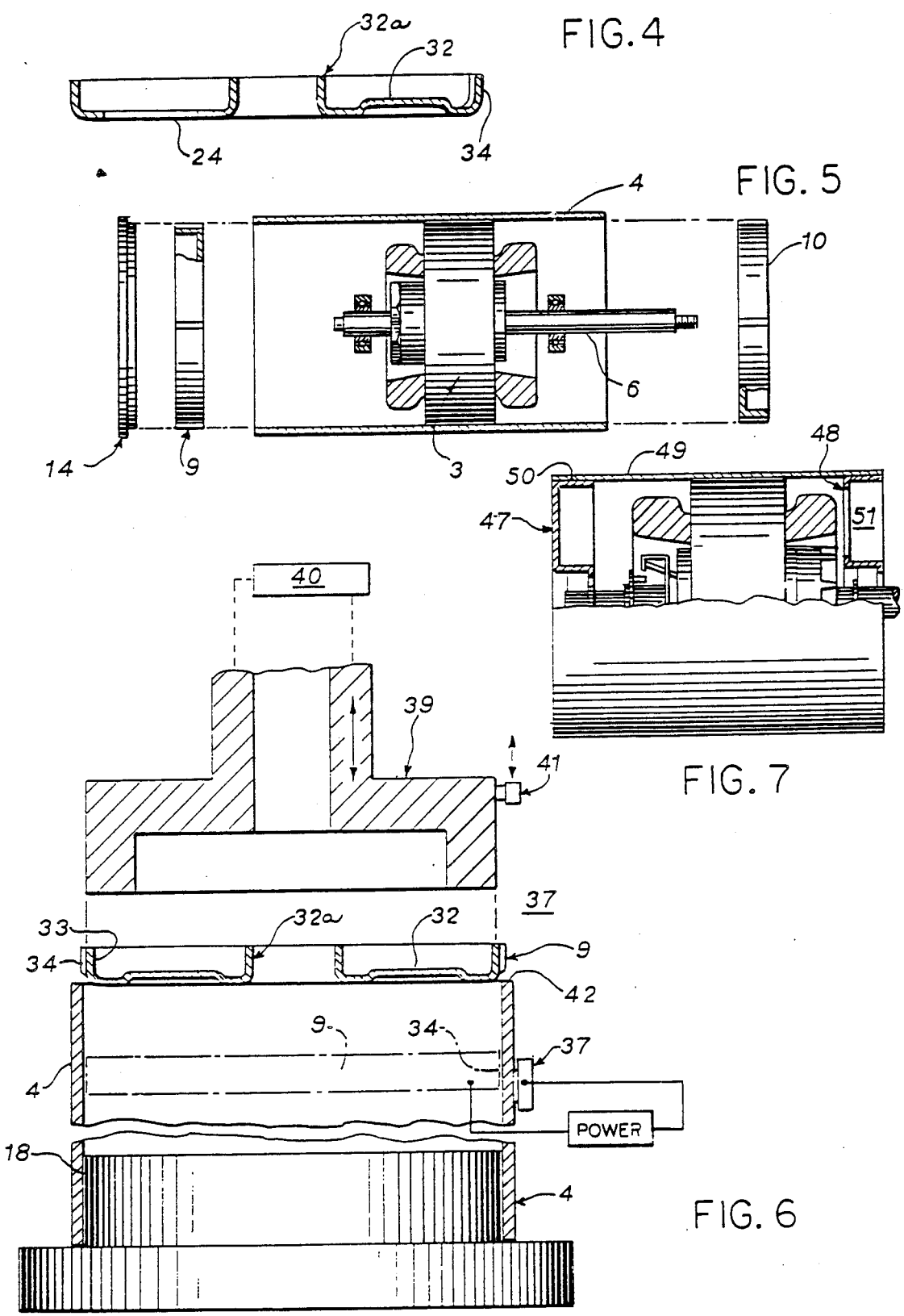

METHOD OF FABRICATING A DYNAMEOELECTRIC MACHINE

BACKGROUND OF THE PRESENT INVENTION

This invention relates to dynamoelectric machines with internal frame walls and to the method of fabricating the machine with such internal frame walls.

Electric motor, and particularly fractional horsepower motors are widely used or applied to various applications requiring various speed and other related controls. Further, a basic motor construction incorporates an annular stator unit mounted within a round frame. The opposite ends of the round frame are closed by bearing frames or bearing plates, each of which include a rotor core aligned with the stator core and rotatably mounted by a shaft extending from the opposite ends of the rotor core and journaled in the bearings in the bearing frames. The frame may be formed of an extended length to define a space adjacent one end of the motor within which a lead circuit board unit is provided for interconnecting of the windings to the incoming power supply. In many applications, a centrifugal starting switch unit is also mounted with the space for controlled starting of the motor with an automatic disconnect of a start winding. Electronic control systems have also been widely developed for controlling the operation of the motor, either through manual or sensed conditions. Electronic controls present particular problems and considerations from the standpoint of isolating the control components from adverse environments. Thus, moisture, dirt and the like can adversely affect electronic controls. Consequently, the controls are generally housed in a separate protective enclosure secured to the motor structure or in spaced relation thereto and interconnected to a suitable connecting cable.

The motors to which the present invention has been applied are widely used in ventilating and exhaust fan applications, water and other fluid pumping systems and the like. Generally, the motor is formed with a shaft extension on one end for coupling to the load such as a fan, pump or the like. The opposite end of the motor is generally closed with the shaft terminated within an end bearing member. The U.S. patent application of King, entitled "Electric Motors Having Integral Control Housing And Method Of Fabrication", filed Feb. 6, 1989 with Ser. No. 07/306,887 and assigned to a common assignee with the present application, discloses a separate end cap secured to an end bearing frame of a motor to define a separate control chamber particularly adapted for customizing a standard motor module to various applications and specifications including modern electronic control circuitry, and particularly adapted to the several applications noted above. A multiple compartmented structure is disclosed in the co-pending application/of King et al entitled "Multiple Compartmented Dynamoelectric Machine", filed on Oct. 26, 1989 with Ser. No. 427,441 and assigned to a common assignee herewith. As more fully disclosed in the above application, a single integrated cylindrical or round motor frame has the stator core secured within an intermediate location. At least three compartment walls are secured in axially spaced relation in a round frame. Two of the wall members are constructed as end bearing frames and are secured within the round motor frame to rotatably support the rotor shaft and thereby the rotor unit within the stator bore. The third wall is located and secured within the round motor frame and in combination with one of the bearing frames defines a control or auxiliary component compartment, as more fully disclosed therein. Additional wall structures can be incorporated into the cylindrical frame to form additional auxiliary component chambers or compartments which are essentially closed, except for such openings required for the particular auxiliary component within the compartment. Finally, the multiple compartment walls within the frame are preferably similar wall structures and connected by similar wall attachment to the cylindrical frame to provide for effective and cost efficient assembly. The present invention is particularly directed to an effective structure and attachment method for mass production of integral fractional horsepower motors or the like where cost is of practical significance.

SUMMARY OF THE PRESENT INVENTION

The present invention is particularly directed to a dynamoelectric machine having a round frame and internal wall structures having an outer attachment wall for locating of the wall structure within a round frame, and is more particularly related to the internal wall structures for closing of the standard round main frame of a rotating motor including bearing frame members secured within the main frame. Generally, in accordance with the present invention, the bearing and closure walls are formed as a shallow cup-shaped metal frame member having an outer cylindrical flange or lip extending as a continuous member about the circumference of the end wall. The end wall is preferably formed with stengthening ribs. The cylindrical lip is specially constructed to have a maximum diameter slightly greater than the internal diameter of the round motor frame. The wall member is pressed into the round frame with the frame located on a precise radial plane through the round frame and thereby precisely perpendicular to the rotating axis of the rotor. The center of the wall includes a rotary bearing support within which the rotor bearing is secured. In assembly the wall member is pressed into precise location within the main round frame. The wall is readily held within the frame as a result of the press fit. The wall is secured to the round frame in any suitable manner. With a steel wall member, the round frame is conveniently secured to the end frame lip through suitable welding including spot, resistance, arc and rejection welding. Alternatively, laser fusion can be employed. If the wall member is formed of a suitable cast or molded material, such as a cast zinc, aluminum, or a molded plastic, the round motor frame is conveniently secured in place using laser fusing. Other forms of securement can, of course, be provided including conventional rivet screws or pins. Chemical bonding, particularly using recently developed proxy adhesive elements, can also be used.

In a preferred construction, a stamped steel cup-shaped bearing frame is formed as a stamped steel member with the integral outer lip having a plurality of small radial projections extending axially along the length of the lip. The plurality of projections are equally circumferentially distributed. The bearing frame is pressed into the round frame using a suitable hydraulic press or the like. The end face or edge of the round frame is machined or otherwise formed to form a reference for locating of the bearing frame in the round frame. After location of the bearing frame to the round frame, it is suitably secured to the frame in any suitable manner.

The present invention is particularly adapted to a practical cost-effective assembly and fabrication of a stamped steel end frame and its assembly with a round frame. Thus the frame with the stator therein is preferably supported in a vertical fixture of a suitable ram press unit. The cup-shaped wall or bearing frame is mounted within the press in precise alignment with the round frame, and a press ram moved axially to force the wall into place until a reference surface or wall on the ram engages the end of the round frame, thereby precisely locating the bearing frame within the round frame. Once in position, the bearing frame is secured to the round frame by any suitable means, such as a radially actuated mechanism or securement means unit such as a welding, fixed screws, adhesives or the like.

The fabrication and assembly is based on readily available present-day technology, can operate at a high rate of production while establishing and maintaining very accurate positioning of the bearing frame, which is particularly of significance in the proper location of the rotary bearings with respect to the positioning of the rotor within the stator. The round main frame can be formed and maintained with a smooth outer surface to establish a most aesthetically acceptable motor configuration.

Although the present invention is uniquely directed to the construction and assembly of an end bearing frame, the invention can be employed to provide the internal dividing wall structure such as that required in multiple compartment motors, such as more fully disclosed in the co-pending application of King et al.

BRIEF DESCRIPTION OF THE DRAWINGS

The drawings furnished herewith illustrate preferred embodiments of the present invention in which the above advantages and features are disclosed.

In the drawings:

FIG. 4 is a vertical cross-section taken generally on line 4—4 of FIG. 3;

FIG. 5 is an exploded view of the motor shown in FIGS. 1-4;

FIG. 6 is a diagrammatic view illustrating a method of assemblying the motor shown in FIGS. 1-5; and FIG. 7 is a fragmentary side elevational view with parts broken away to show a two compartment motor incorporating a modified end frame in accordance with the teaching of the present invention.

DESCRIPTION OF THE ILLUSTRATED EMBODIMENT

Figure 1:
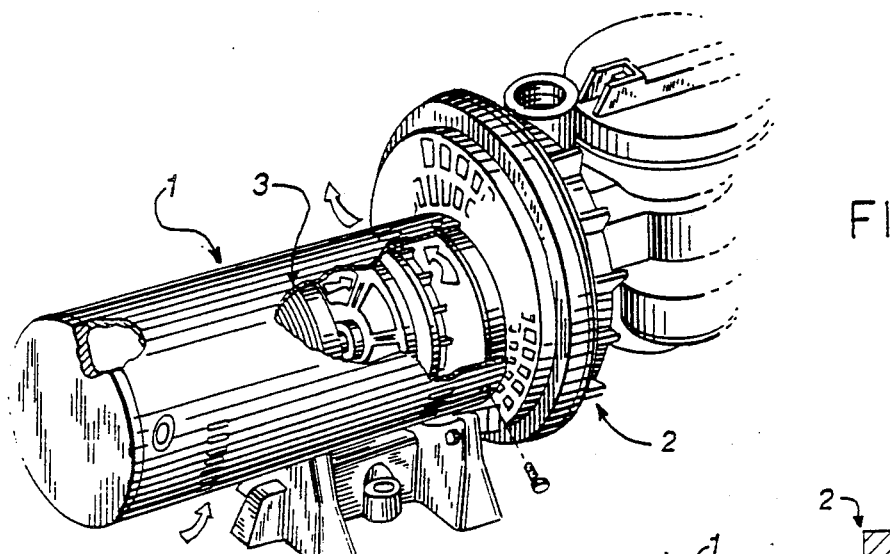
FIG. 1 is a side elevational view of an electric motor with parts broken away and sectioned to show detail of contruction.
Figure 2:
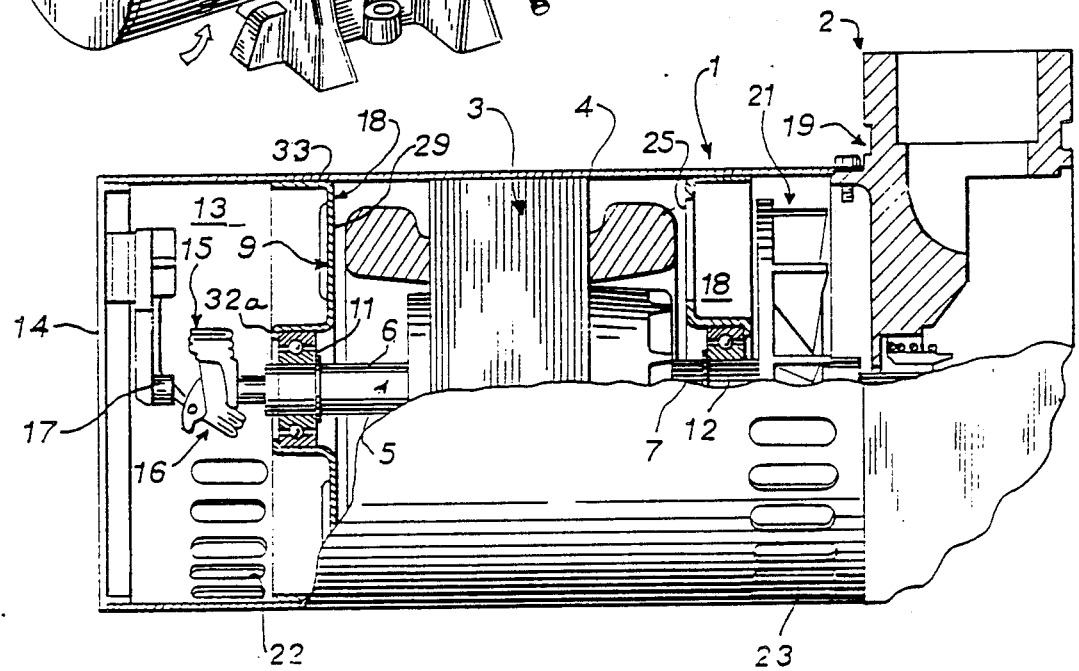
FIG. 2 is an end view of FIG. 1.

Referring to the drawings and particularly to FIGS. 1-5, an electric motor 1 is illustrated connected to drive a pump unit 2, with the construction as shown and fully described in the previously identified copending application of King et al. The motor unit 1 is a typical fractional horsepower motor including an annular stator unit 3 secured within a tubular round main frame 4. A cylindrical rotor unit 5 is located in alignment within the annular stator unit 3. The rotor unit 5 includes a shaft structure including shafts 6 and 7 projecting coaxially from the opposite ends of the rotor unit 5. Shaft 7 projects outwardly of the round motor frame and is coupled to drive the pump unit 2. The shafts are journaled and rotatively supported in opposite bearing frames 9 and 10 within the round motor frame 4. The end bearing frame 9 is shown aligned with the outer end of the shaft 6 with a suitable roller bearing 11 located within the center of the frame 9 in accordance with more or less well known practice. A bearing 12 is similarly located within the bearing frame 10 and supports the shaft 7 projecting outwardly therefrom.

The bearing frame 9 is located within and spaced from the outermost end of the round frame 4, and defines a chamber 13 between the end bearing frame 9 and the end of the round frame 4. An end cap or closure wall 14 is secured within the end of the frame adjacent shaft 6 which closes the chamber 13. In the illustrated embodiment of the invention, a centrifugal switch unit 15 is secured to the end cap and located within the chamber 13. A centrifugal actuator 16 is shown secured to the end of the shaft 6 for operating the switch unit 17 in accordance with known construction. Other control components such as the capacitor for capacitor start motors, electronic controls for variable speed and intermittent motors and the like can be housed within the control chamber. The bearing frame 10 is also set inwardly at the opposite end of the tubular frame and similarly defines a chamber 18 between bearing frame 10 and the adjacent end of the frame 4. The chamber 18 is closed in the illustrated embodiment by the housing 19 of pump unit 2 which includes a mounting flange projecting into the chamber. A fan unit 21 is located and coupled to the shaft within chamber 18, which also forms a separate drip chamber between the motor 1 and the pump unit 2. The fan unit 21 draws air through the motor for purposes of cooling the motor. The extended motor frame 4 includes similarly formed and circumferentially spaced slots or openings 22 and 23 provided in the chambers 13 and 18. The bearing frames 9 and 10 similarly include openings 24 and 25 to complete an air flow passage through the motor 1.

The present invention is particularly directed to the structure of the bearing frames 9 and 10, the end cap and the method of assembly within the round motor frame. Such structure is disclosed in detail, with other members described as required for a full and complete understanding of the present invention.

Figure 3:
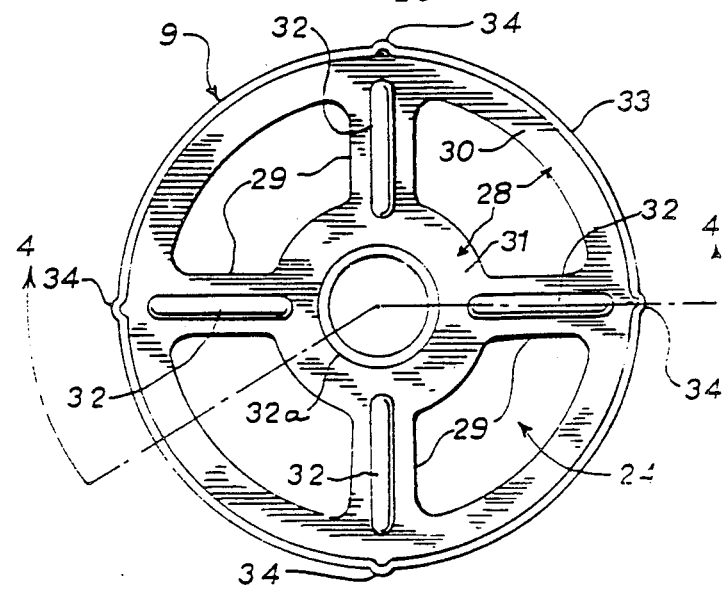
FIG. 3 is a vertical cross-section taken generally on line 3—3 of FIG. 2.

Referring to the drawings and particularly to FIGS. 3 and 4, an end bearing frame 9 of a preferred construction is illustrated. The bearing frame 9 is shown as an integral member having a planar end wall structure 28 including four equicircumferentially distributed arms 29 interconnecting an outer annular wall 30 and to an inner annular wall 31. The frame 9 is preferably formed as a stamped metal member of a suitable steel or the like. Each of the connecting arms 29 is formed with a rib 32 extending substantially throughout the length of the arm and preferably into the annular walls to establish and increase the strength of the bearing frame. The inner annular bearing wall 31 is formed with an inwardly projecting bearing hub 32a with the bearing 11 secured therein. The bearing hub 32a extends as a continous round member and is shaped to securely support the rotary bearing 11 pressed or otherwise secured therein. The outer annular wall 30 is integrally formed with an inwardly projecting lip or flange 33 projecting inwardly and terminating essentially in a common radial plane with the bearing hub.

The outer annular lip 33 is also a continuous member encircling the total bearing frame. In the illustrated embodiment, four equicircumferentially spaced projections 34 are formed in the outer surface of lip 33. Each projection 34 is shown aligned with the radius through an adjacent wall arm 29. In a practical construction, the projection 34 is integrally formed as a stamped offset member with the projections on diametric opposite positions defining an outer diameter slightly greater than the internal diameter of the round frame 4. The frame 9 is thereby specially constructed to create a press fit within the round frame 4. The frame 9 is located in a plane precisely perpendicular to the axis of the rotor shafts 6–7. Thus, by pressing of the frame 9 in a precise manner within the round frame, the bearing hub 32a and bearing 11 is accurately located to support the rotor unit 5 within the stator unit 3 with the thrust bearing surfaces properly located to establish and maintain a selected air gap between the stator and rotor.

After assembly of the stamped steel frame 9 into precise axial location within the round frame 4, a suitable welding unit 35 (shown in FIG. 6) is preferably applied to the round frame 4 in alignment with the projections 34 to create an interface weld 36 and establish a firm, reliable interconnection therebetween. A preferred method is resistance welding which minimizes the distortion on the exterior main frame 4 and retains the smooth outer shell finish.

The stamped steel bearing frames 9 and 10 can be readily constructed with the necessary strength to absorb the various load forces, both magnetically created and mechanically created on the bearing structures and the supporting frame structure.

In the fabricating of the motor 1, the stator unit 3 and the rotor unit 5 are formed in any suitable manner, with the stator unit 3 secured within the frame 4. At least the one bearing frame, such as frame 9, is press fitted into the round motor frame 4. The rotor unit 5 is then assembled within the stator unit with the shaft 6 journaled in the bearing 11 of the first assembled bearing frame 9. The second bearing frame 10 is then passed over the shaft with the lip or flange 33 precisely aligned with the frame 4, and then pressed into the frame 4. The frames 9 and 10 are then appropriately fixed to frame 4.

The assembly of the end bearing frames 9 and 10 into the round main frame 4 preferably uses a ram press unit 37, such as diagrammatically illustrated in FIG. 6. The press unit 37 includes a vertically oriented fixture 38 within which the motor frame 4 is fixedly supported after assembly of the stator unit 3 within the frame 4. A ram unit 39 having a diameter slightly less than the internal diameter of the frame 4 and also smaller than the outer diameter of the bearing frame 9 is mounted for powered vertical movement through any suitable power head 40. The ram 39 is adapted to be moved a suitable distance for locating of various wall structures within the round frame 4, and is spaced outwardly from the position of the round frame 4 sufficiently for assembly of the bearing frames 9 and 10 and any intermediate wall structure in alignment with the upper opening end of the round frame 4. In the procedure for assembly of the motor, the round frame 4 is first secured within the fixture 38 with the ram 39 raised. The flat cup-shaped bearing frame 9 is positioned in precise alignment with the upper open end of the main frame 4. The ram 39 is then moved downwardly into engagement with the frame, and thereafter moved to press the frame 9 into the aligned main frame 4. The ram 39 includes an adjustable reference member 41 which is vertically adjustable to preset the position of member 41 relative to the ram. The reference member 41 is set to engage the upper end face or edge 42 of the frame 4 when the frame 9 is properly located in the frame 4. The edge 42 of frame 4 is readily formed as a precise reference surface. The distance and location of the bearing frame 9 for proper location with respect to the thrust surfaces of the rotor shaft is well known and a controlled dimension. Thus, by providing of the adjustable reference member 41 on the ram 39, the press unit uses the end edge 42 of the frame 4 as the stop for precise location of the bearing frame.

After assembly of the one bearing frame 9, the rotor and shaft unit 5 can be installed with the shaft journalled in the installed bearing frame. The motor frame 4 is placed in the press fixture 38 in the reverse position to expose the opposite open end of the frame 4. The second bearing frame 10 is aligned with the open, over the shaft, and with the bearing frame abutting and resting against the open end of the round main frame 4. The pressing head or ram 39 is again lowered into engagement with the bearing frame. The stop member 41 is again set to provide the precise inward positioning of the bearing frame 10 in accordance with the thrust surfaces to appropriately locate the second bearing frame within the frame 4.

After the appropriate assembly of the frame members 9 and 10, the frames are affixed to the round frame by the resistance welding or any other suitable interconnecting means. The basic motor structure is then complete.

Any suitable control can then be mounted within the control chamber and the end cap 16 press fitted into the round frame 4. The end cap 16 may be constructed as a removable unit. The illustrated end cap 16 has a lip projecting into the frame 4, with set screws 40 passing through openings in frame 4 and threaded into threaded openings in the cap 16.

The described method provides a readily constructed assembly with a high rate of production. Thus, all of the component parts are vertically installed and once each part is appropriately radially aligned, the press unit provides a very ready and rapid means of assembly. After the assembly of the press fit assembly, the welding or other suitable attachment systems can be readily applied to complete the motor assembly. Using the main frame as the stop for locating of the bearing frames and other internal wall structures provides a highly effective method to control the required distances as well as maintaining the high production rate.

Although the cup-shaped bearing frame is shown and described with the welding projections for securing of the elements within the unit with a resistance welding procedure, other methods of attachment can be readily applied in accordance with the present invention. Although described with resistance welding, any other form of welding can of course be employed including spot, arc and projection welding. Further, laser fusing of metals is readily applied with present day technology. Other forms of attachment would use pins or screws projecting radially through the frame into securing interengagement with the flange or lip, which would be formed without the welding projections. Suitable chemical and adhesive bonding materials can be interposed between the interface surfaces of the round frame and the other frame members. Various cold forming interengaging surfaces can also be employed for appropriate upsetting of the surfaces either outward or inwardly of each other. Various staking and lancing as well as stitching systems using cold forming processes are known.

Further, although described in a preferred construction using a stamped steel end frame, the frame members and wall structures can be readily made of other materials. For example, the frame members can be formed of a cast zinc or cast aluminum and interconnected to the round frame generally in accordance with the methods applied to attach a steel end frame. Welding processes would preferably use a laser fusion process in contrast to other forms of welding. Further, end wall structures can be readily formed of plastics with present day plastic materials, and readily formed by injection molding or otherwise. Plastic wall members can be readily secured to a metal or plastic frame by laser fusion, suitable adhesive as well as the various form attachments using rivets, screws, pins and the like. Thus, the interconnection of the end or bearing frames and the round frame can be made in any desired process or procedure but the external resistance welding, usage of adhesive and the like is highly desirable to maintain a smooth, unblemished outer round construction.

The motor, when applied to a pump unit as disclosed and in other applications, is intended for and used in various consumer products and particularly spas, whirlpools, and the like. The esthetic appearance is of substantial consideration in such applications.

Although shown with the frames located with the flange or lip projecting inwardly, the frames can be readily constructed for reverse mounting within the main round frame.

The application of the present invention is shown in the first embodiment applied to a multicompartment motor which particularly forms the subject matter of the previously identified co-pending application filed on Oct. 26, 1989 with Ser No. 07/427,441. The present invention is of course applicable to a single compartment or other multicompartment motors.

A simplied illustration of an alternate construction is illustrated in FIG. 7, wherein bearing frames 47 and 48 are mounted flushed to the ends of a round main frame 49 to provide a single motor chamber construction. The controls and auxiliary equipment for the motor would be contained in some form of an external structure or the like.

The bearing frames are again formed as cup or dish-shaped members with a flange or lip 50 facing outwardly of the frame 4. The frames 47 and 48 are appropriately pressed into frame 4 and may be located to define an end control or auxiliary chamber, as shown at 51, within the motor frame 4. The chamber may be open or closed by a suitable corresponding inwardly projecting end cap 52 which is pressed fitted in the same manner within a frame 4 as heretofore discussed with respect to the first illustrated embodiment.

Although the closure member is releasably secured within the frame 4 to permit the access to the controls or the like, a fixed member may be provided and includes access openings for entrance to the integral system and the like. In an instance wherein an internal wall is used as an end of a chamber, the location is not critical such as with a bearing structure, and consequently can be located in any suitable manner. Use of the end edge of the main frame however provides a method for a reliable and repeatable construction within a line of motors.

Various modes of carrying out the invention are contemplated as being within the scope of the following claims particularly pointing out and distinctly claiming the subject matter which is regarded as the invention.

We claim:

1. The method of fabricating an electric dynamoelectric machine having a cylindrical rotor core having shaft members extending from the opposite ends of said rotor core for supporting the rotor core within an annular stator core, said shaft members having predetermined bearing thrust surfaces to the opposite sides of said rotor core, comprising securing said stator core within an intermediate portion of a round frame of a rigid supporting material, said frame having a constant internal diameter, forming a cup-shaped end frame having an outer flange of constant diameter slightly greater than said internal diameter to interfere with insertion of the end frame into said round frame and an inner bearing hub with a bearing axis of rotation having a precise radius to said flange, a bearing secured within said hub, pressing said end frame into said round frame with said bearing axis and with said bearing thrust surface precisely located in spaced relation to the axial location of said thrust surface of said rotor shaft and with said end frame secured in place by an interference fit, and fixedly securing said flange to said round frame to precisely locate said bearing relative to said rotor shaft and rotatably supporting said rotor core within said stator core.

2. The method of fabricating in accordance with claim 1, wherein said round frame includes axial end edges precisely axially spaced relative to the location of said end frames, and said pressing step included aligning said end frames with the round frame within a pressing fixture, moving a ram member into engagement with the end frame inwardly of said round frame and forcing said end frame into said round frame until said ram reference element engages the end of said round frame.

3. The method of fabricating in accordance with claim 1, including forming said flange with a plurality of at least three substantially radial projections defining said outer diameter, and fixedly securing said projections to said round frame.

4. The method of fabricating a rotary motor including a stator unit having a core fixedly mounted within a round frame and in spaced relation to the opposite ends of the round frame, said round frame having end edges in a plane precisely perpendicular to a center axis of said stator core and having a rotor unit rotatably mounted within said round frame and including a rotor core aligned with said stator core and end shaft members projecting axially from the rotor core, said shafts being journalled in rotary bearings secured within end frame members secured within said round frame comprising the steps of mounting said round frame with said stator core affixed therein in a press fixture and with said axis of said stator in a vertical orientation, forming an end frame member having an outer diameter slightly greater than the internal diameter of said round frame, aligning said end frame with said round frame, actuating a powered press unit to force said end frame into said round frame until said ram engages said end edge of said round frame and thereby precisely locate said end frame within said round frame, assemblying the rotor unit within said stator with the shaft journalled in tee end frame secured within the round frame, aligning a second end frame with the opposite end of the frame and with the shaft member projecting through said bearing opening, actuating said powered press unit to press fit said second end frame into the second end of said round frame until said ram engages the end edge of said round frame to precisely locate the second end frame within said round frame.

5. The method of claim 4, including the step of fixedly securing the end frame member to the round frame.

6. The method of claim 4, including forming said end frame members with an outer flange having a plurality of at least three equispaced outer projections defining said outer diameter, and welding said round frame to said projections to fixedly secure said end frame member to said round frame.

* * * * *